(12) United States Patent
Wu et al.

(10) Patent No.: US 8,553,402 B2
(45) Date of Patent: *Oct. 8, 2013

(54) SLIDING MODULE FOR ELECTRONIC DEVICE

(75) Inventors: Ke-Long Wu, Shenzhen (CN); Chao Duan, Shenzhen (CN); Chia-Hua Chen, Shindian (TW)

(73) Assignees: Shenzhen Futaihong Precision Industry Co., Ltd., Shenzhen (CN); FIH (Hong Kong) Limited, Kowloon (HK)

( * ) Notice: Subject to any disclaimer, the term of this patent is extended or adjusted under 35 U.S.C. 154(b) by 235 days.

This patent is subject to a terminal disclaimer.

(21) Appl. No.: 13/176,334

(22) Filed: Jul. 5, 2011

(65) Prior Publication Data

US 2012/0170183 A1    Jul. 5, 2012

(30) Foreign Application Priority Data

Dec. 31, 2010  (CN) .......................... 2010 1 0618139

(51) Int. Cl.
*H05K 5/00* (2006.01)
*H05K 7/00* (2006.01)

(52) U.S. Cl.
USPC ............... 361/679.1; 361/679.3; 361/679.55; 361/679.56

(58) Field of Classification Search
USPC ............. 361/679.01, 679.02, 679.31–679.33, 361/679.38, 679.39
See application file for complete search history.

(56) References Cited

U.S. PATENT DOCUMENTS

| 8,289,706 | B2 * | 10/2012 | Wu et al. | 361/679.56 |
| 8,339,783 | B2 * | 12/2012 | Wu et al. | 361/679.56 |
| 2009/0027837 | A1 * | 1/2009 | Cho et al. | 361/679.01 |
| 2011/0172621 | A1 * | 7/2011 | Lee et al. | 604/365 |
| 2011/0286159 | A1 * | 11/2011 | Wei et al. | 361/679.01 |
| 2012/0120618 | A1 * | 5/2012 | Bohn | 361/749 |
| 2012/0170186 | A1 * | 7/2012 | Wu et al. | 361/679.01 |

* cited by examiner

*Primary Examiner* — Bernard Rojas
(74) *Attorney, Agent, or Firm* — Altis & Wispro Law Group, Inc.

(57) ABSTRACT

A sliding module includes a first section, a second section, a sliding member, a rotary plate, and at least one elastic member. The sliding member is slidably engaged with the second section, and is rotatably connected to the first section. The rotary plate is respectively rotatably connected to the first section and the second section. One end of the at least one elastic member is fixed to the second section, and the other end is fixed to the sliding member. When the sliding member slides relative to the second section, the rotary plate rotates relative to the second section and causes the first section to move and rotate relative to the second section in a tilted orientation.

14 Claims, 7 Drawing Sheets

SLIDING MODULE FOR ELECTRONIC DEVICE

CROSS-REFERENCE TO RELATED APPLICATIONS

The present application is related to U.S. patent application Ser. No. 13/176,338, each entitled "SLIDING MODULE FOR ELECTRONIC DEVICE", by Wu et al. These applications have the same assignee as the present application and have been concurrently filed herewith. The above-identified applications are incorporated herein by reference.

BACKGROUND

1. Technical Field

The present disclosure generally relates to electronic devices, and particularly to a sliding module for an electronic device.

2. Description of Related Art

Portable electronic devices such as mobile phones, laptops, and personal digital assistants (PDAs) are widely used. As such, the sales and use of slide-type portable electronic devices have been on the increase. A slide-type portable electronic device has two housings, of which one slides relative to the other by a slide mechanism to open/close the portable electronic device.

However, the slide-type portable electronic devices typically only allows the two housings to slide parallel to each other. Therefore, when the slide-type portable electronic device is placed horizontally, it can be difficult for users to view a display screen on the housing.

Therefore, there is room for improvement within the art.

BRIEF DESCRIPTION OF THE DRAWINGS

Many aspects of the tilt mechanism for electronic device can be better understood with reference to the following drawings. The components in the drawings are not necessarily to scale, the emphasis instead being placed upon clearly illustrating the sliding module for electronic device. Moreover, in the drawings, like reference numerals designate corresponding parts throughout the several views.

DETAILED DESCRIPTION

Figure 1:
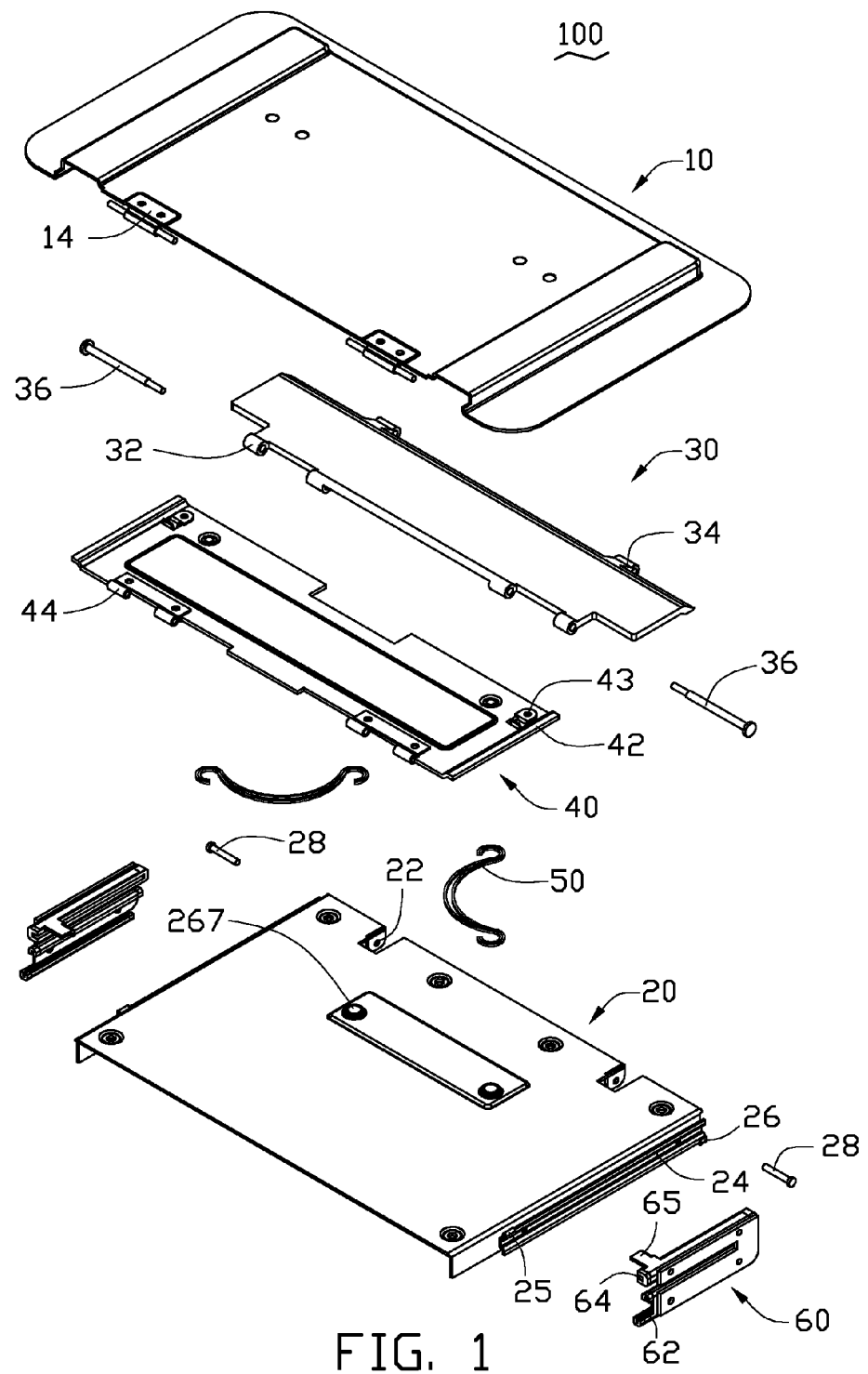
FIG. 1 is an exploded, isometric view of a sliding module according to an exemplary embodiment.
Figure 2:
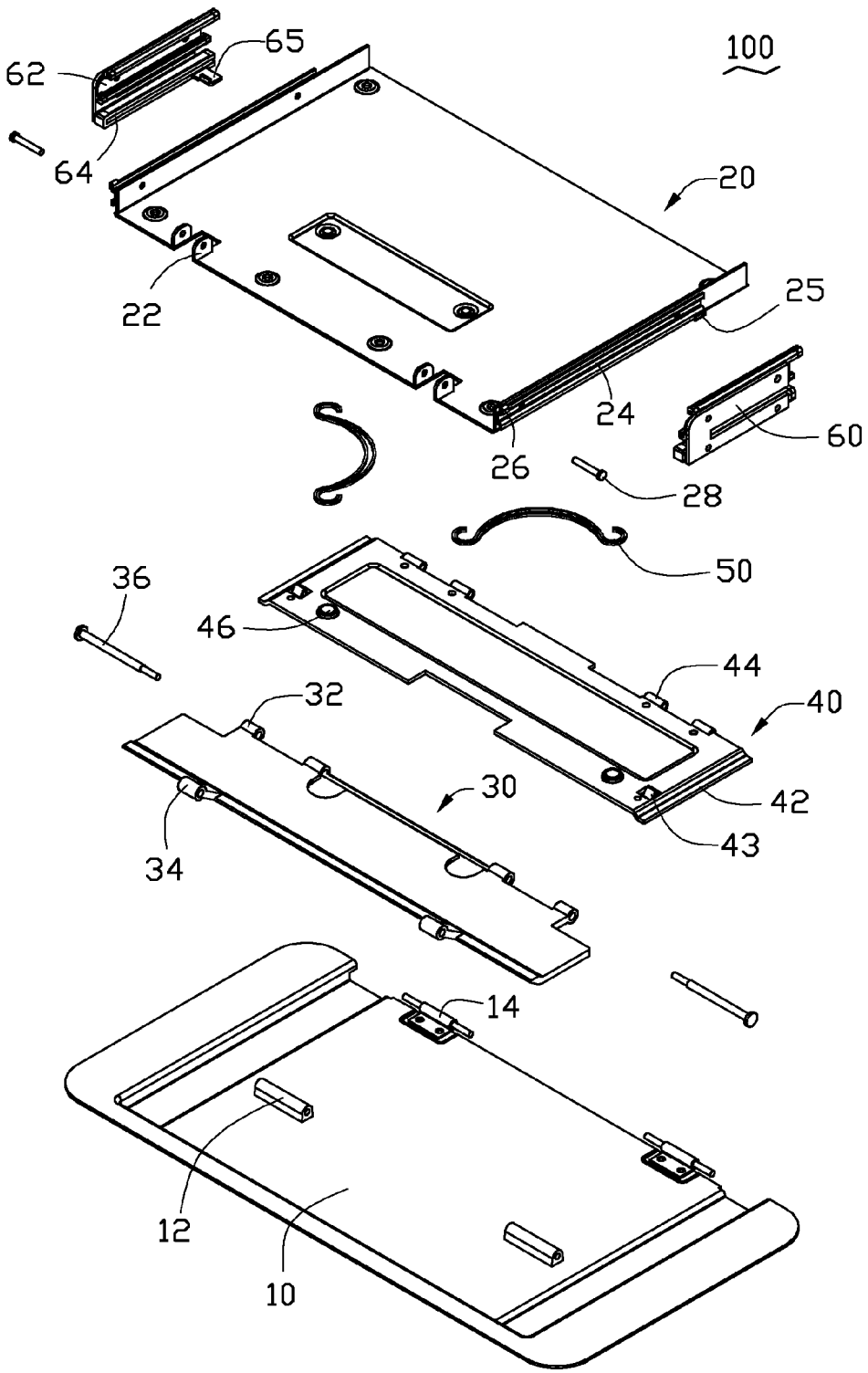
FIG. 2 is similar to FIG. 1, but shown from another angle.

FIG. 1 and FIG. 2 show an exemplary embodiment of a sliding module 100 applied in an electronic device, such as a mobile phone, or a personal digital assistant. The sliding module 100 can be in a flat, closed orientation and a tilted, open orientation. The sliding module 100 includes a first section 10, a second section 20, a rotary plate 30, a sliding member 40, two elastic springs 50, and two connecting members 60. In the flat, closed orientation, the first section 10 and the second section 20 overlap each other. In the tilted, open orientation, the second section 20 tilts relative to the first section 10 for better viewing.

Referring to FIG. 2, at least one pivot seat 12 is formed on a surface of the first section 10 for connecting the rotary plate 30. In this exemplary embodiment, the first section 10 has two pivot seats 12 at opposite sides of the surface thereof. The pivot seats 12 are rotatably connected to one side of the rotary plate 30. The first section 10 has two connecting portions 14 at one side thereof for rotatably connecting the sliding member 40.

At least one pair of hinge tabs 22 is formed on the second section 20 for connecting the rotary plate 30. In this exemplary embodiment, the second section 20 has two pairs of hinge tabs 22 for connecting the other side of the rotary plate 30. Each edge of the second section 20 respectively forms a rail 24 for slidably connecting the connecting plate 60 to the second section 20. Each edge of the rail 24 respectively forms a first protrusion 25 and a second protrusion 26. The first protrusion 25 and the second protrusion 26 are respectively for stopping two sides of the connecting plate 60. Pins 267 are formed on the second section 20 for connecting to one end of each elastic member 50.

The rotary plate 30 includes two first hinged portions 32 and two second hinged portions 34 formed at opposite sides thereof. The first hinged portions 32 are connected to the pivot seats 12 with shafts 36. The second hinged portions 34 are connected to the hinge tabs 22 with shafts 28.

The sliding member 40 includes two guiding edges 42 at opposite sides thereof. An elastic element 43 is positioned on the sliding member 40 adjacent to a corresponding guiding edge 42. One side of the sliding member 40 includes two fixed portions 44. Each fixed portion 44 is rotatably connected to a corresponding connecting portion 14. The sliding member 40 includes two pins 46 for connecting the other ends of each elastic spring 50.

Each elastic spring 50 may be, e.g., a wire spring, a pressure spring, a torsion spring, or a spring plate, etc. One end of the elastic springs 50 is mounted to the pins 26 of the first section 10, and the other end of the elastic springs 50 is mounted to the pin 46 of the sliding member 40. Thus, the elastic springs 50 connect the first section 10 and the sliding member 40.

Each connecting member 60 includes a first sliding portion 62 and a second sliding portion 64 integrally formed together or assembled together. The first sliding portion 62 is slidiably engaged with the rails 24 of the second section 20. The second sliding portion 64 is slidably engaged with the guiding edges 42 of the sliding member 40. A protruding tab 65 extends from one side of each second sliding portion 64. The protruding tab 65 can be stopped by the elastic elements 43 to stop the reverse slide of the sliding module 100.

In assembly, the first sliding portions 62 of the connecting members 60 are respectively slidably connected to the rails 24 of the second section 20. The sliding member 40 is disposed on the second section 20, and the guiding edges 42 are slidably connected to the second sliding portions 64 of the connecting members 60. One end of each elastic spring 50 is mounted to a pin 26 of the first section 10, and the other end of each elastic spring 50 is mounted to a pin 46 of the sliding member 40. The first hinged portions 32 of the rotary plate 30 are connected to the pivot seats 12 of the first section 10 with the shafts 36. The second hinged portions 34 are connected to the hinge tabs 22 with the shafts 28. The fixed portions 44 are rotatably connected to the connecting portions 14 of the first section 10. Accordingly, the sliding module 100 is assembled.

Figure 3:
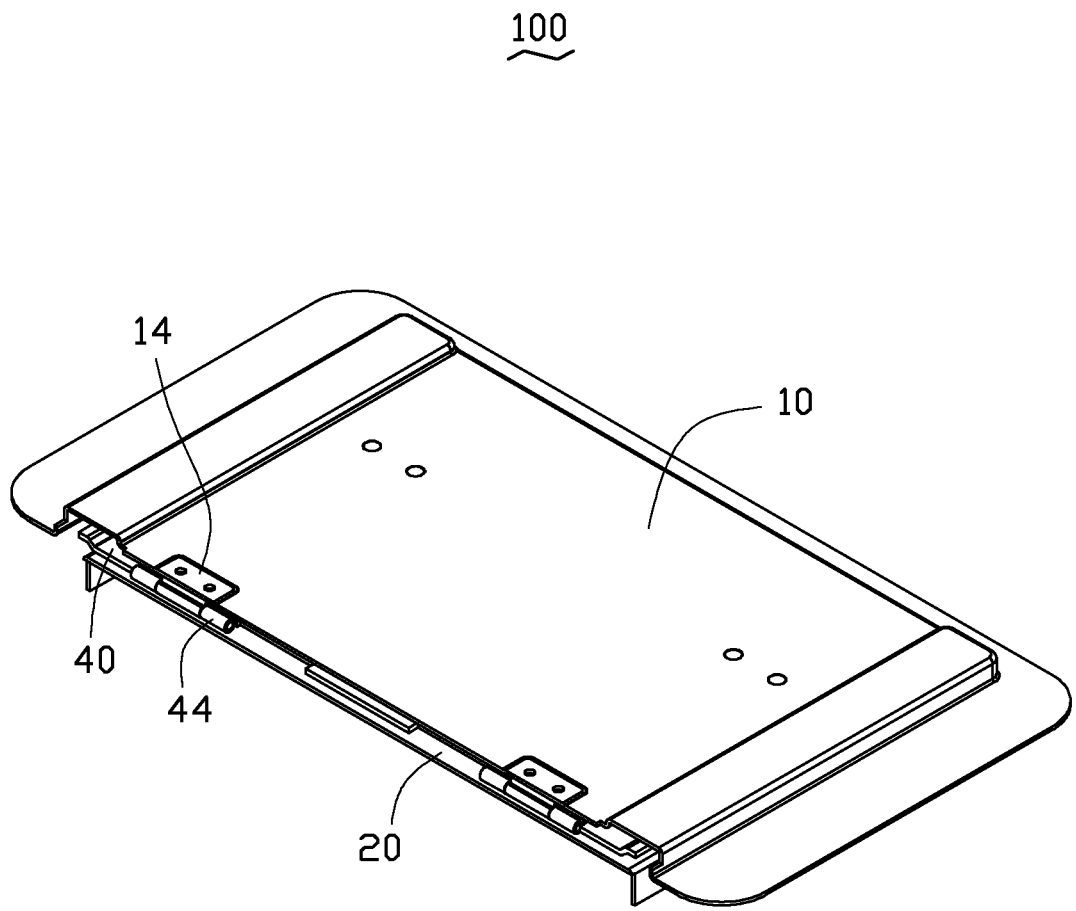
FIG. 3 is an isometric view of the sliding module of FIG. 1 in a flat, closed orientation.
Figure 4:
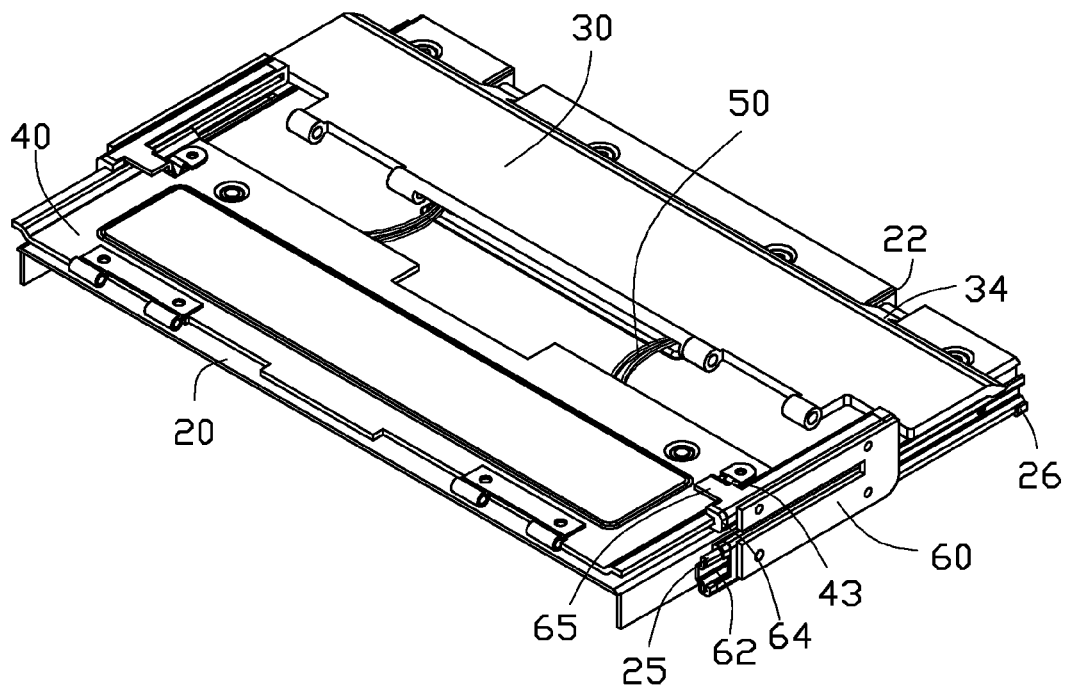
FIG. 4 is an isometric view of the sliding module of FIG. 3 omitting a first section.

Referring to FIGS. 3 and 4, when the sliding module 100 is in a flat, closed orientation, the second section 20 overlaps the first section 10. The first protrusions 25 on the second section 20 can stop the connecting members 60, and the protruding tab 65 can stop the elastic elements 43 to limit the sliding member 40 to reversely slide, without the application of an opening force.

Figure 5:
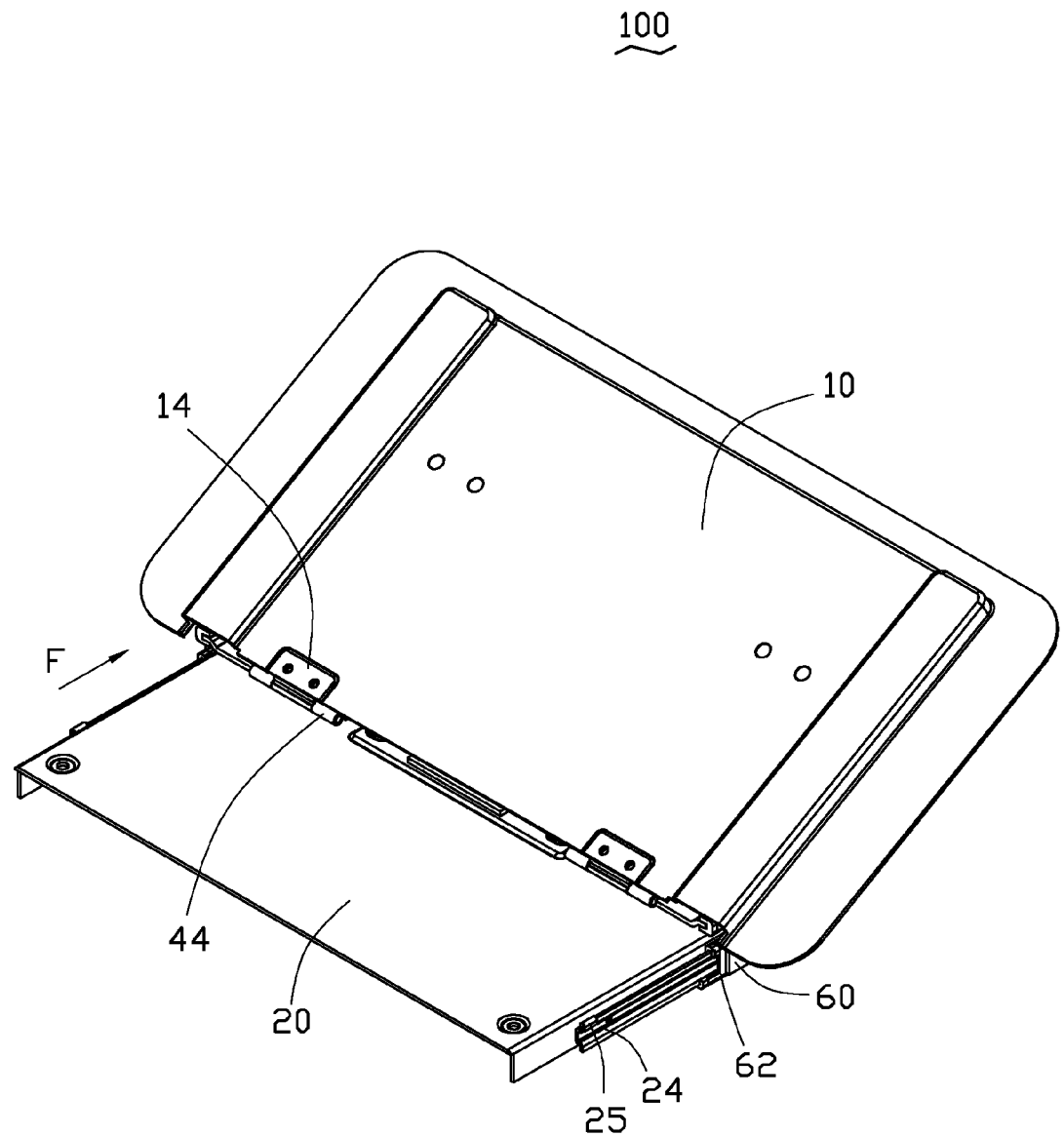
FIG. 5 is an isometric view of the sliding module of FIG. 3 in an open orientation.
Figure 6:
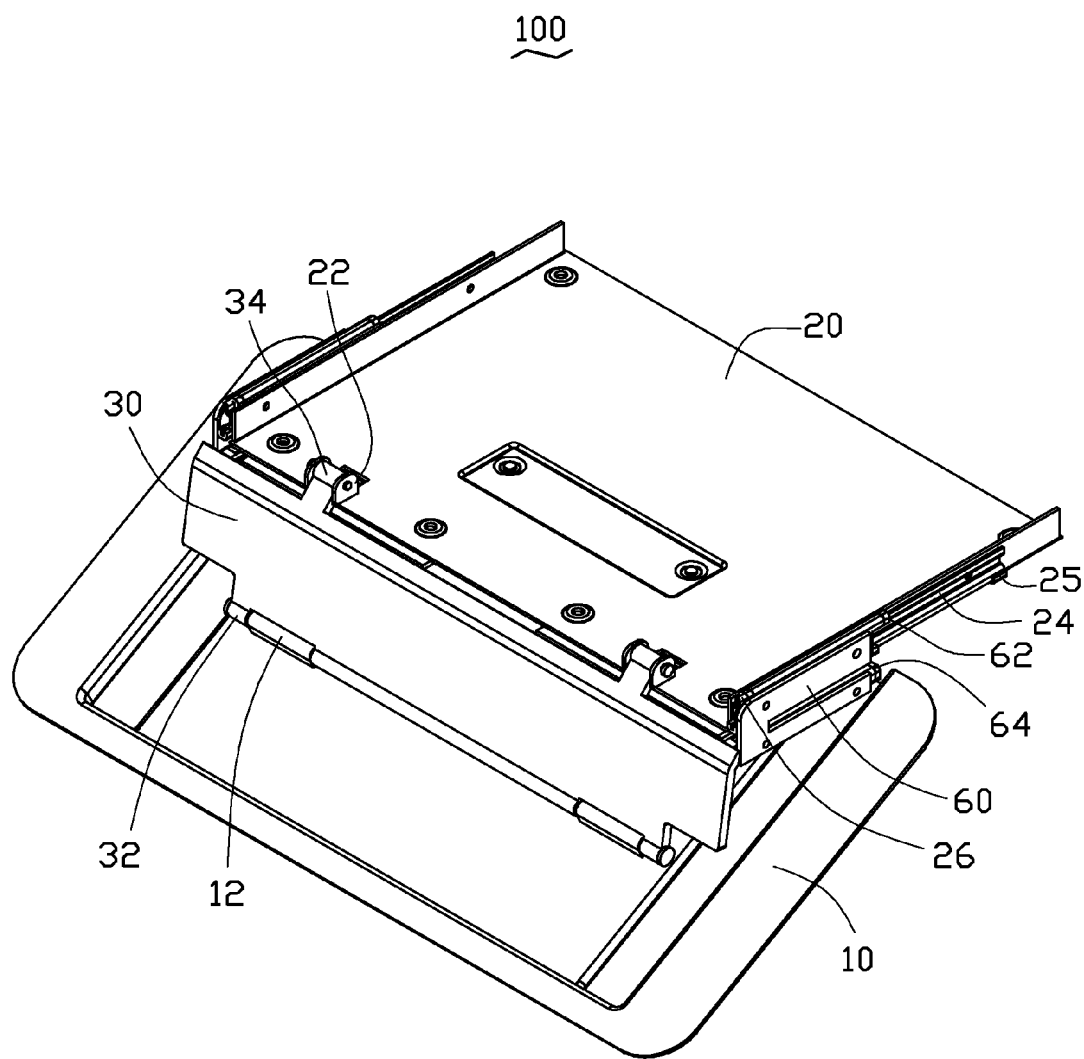
FIG. 6 is similar to FIG. 1, but shown from another angle.

Referring to FIGS. 5 and 6, when the sliding module 100 is opened, a force F is applied to the first section 10 to move the first section 10 away from the second section 20. The sliding member 40 and the first section 10 slide relative to the second section 20, the rotary plate 30 will rotate along the second hinged portion 34 to elevate the first section 10. Thus, the elastic springs 50 accumulate elastic energy until the sliding member 40 slides to a position where the elastic springs 50 are compressed to a maximized deformation. After that, the sliding member 40 can further automatically slide towards the open position by returning the elastic springs 50 from their compressed states to their original states. When the sliding member 40 slides to a distal end of the connecting members 60, the sliding member 40 slides together with the connecting members 60 until the connecting members 60 are stopped by the second protrusion 26. The first section 10 is supported in a tilted position relative to the second section 20.

Figure 7:
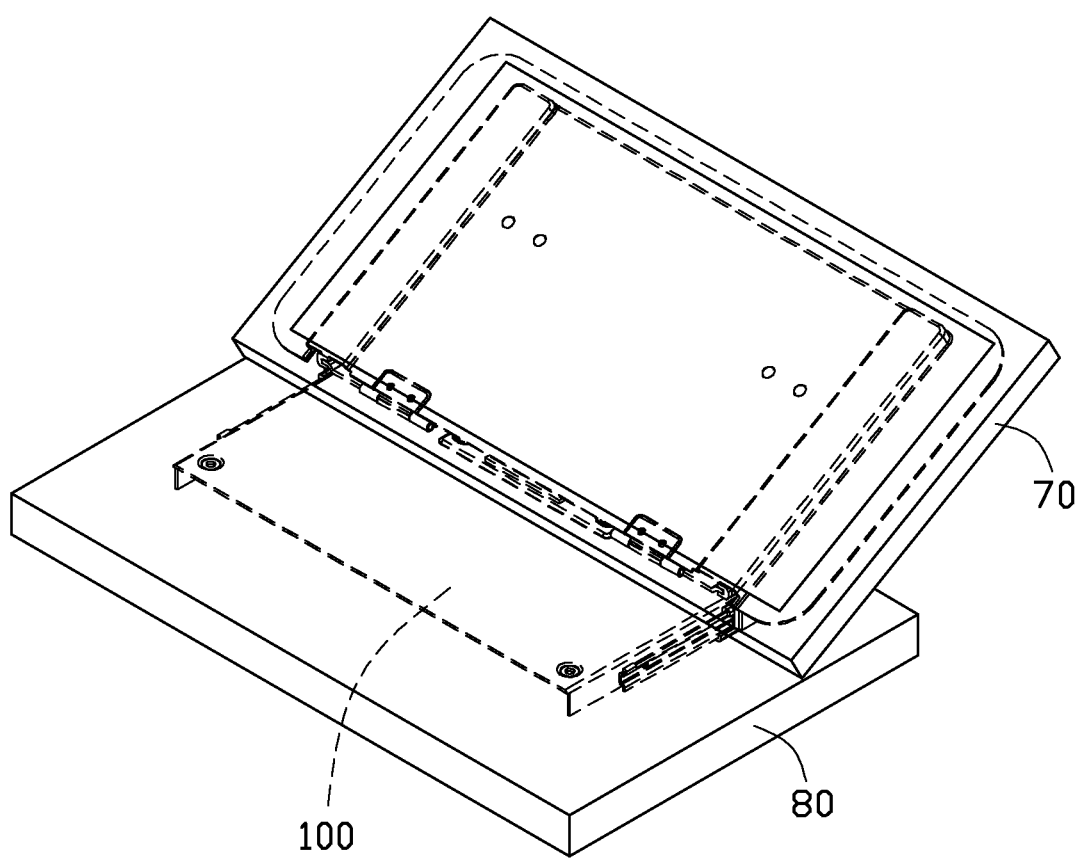
FIG. 7 is an isometric view of the sliding module applied in an electronic device.

Referring to FIG. 7, the sliding module 100 is applied in a portable electronic device 200 such as a mobile phone. The electronic device 200 includes a cover 70 and a housing 80 engageable with the cover 70. The cover 70 is secured to the first section 10, and the housing 80 is secured to the second section 20. Thus, the portable electronic device 200 opens or closes with the sliding module 100.

It is to be understood, however, that even through numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A sliding module comprising:
   a first section;
   a second section;
   a sliding member slidably engaged with the second section, and rotatably connected to the first section;
   a rotary plate respectively rotatably connected to the first section and the second section;
   at least one elastic member, one end of the at least one elastic member fixed to the second section, the other end of the at least one elastic member, fixed to the sliding member; and
   wherein when the sliding member slides relative to the second section, the rotary plate rotates relative to the second section and causes the first section to move and rotate relative to the second section into a tilted orientation.

2. The sliding module as claimed in claim 1, wherein the rotary plate includes a first hinged portion at one side thereof, the first section includes a pivot seat, and the first hinged portion is connected to the pivot seat.

3. The sliding module as claimed in claim 2, wherein the rotary plate includes a second hinged portion formed at an opposite side of the first hinged portion, the second section includes a pair of hinge tabs, and the second hinged portion is connected to the pair of hinge tabs.

4. The sliding module as claimed in claim 1, further comprising a connecting member, wherein the connecting member includes a first sliding portion and a second sliding portion integrally formed together, the first sliding portion is slidably engaged with the second section, the second sliding portion is slidably engaged with the sliding member.

5. The sliding module as claimed in claim 4, wherein a rail is formed on each opposite edges of the second section, the first sliding portion is slidably engaged with the rails.

6. The sliding module as claimed in claim 5, wherein a guiding edge is formed on each side of the sliding member, the second sliding portion is slidably engaged with the guiding edges.

7. The sliding module as claimed in claim 6, wherein a protruding tab extends from one side of each second sliding portion, an elastic element is adjacent to a corresponding guiding edge for stopping a reverse slide of the sliding module.

8. An electronic device comprising:
   a first section;
   a second section;
   a sliding member slidably engaged with the second section, and rotatably connected to the first section;
   a rotary plate respectively rotatably connected to the first section and the second section;
   at least one elastic member connecting the second section to the sliding member for driving the sliding member to slide relative to the second section; and
   wherein when the sliding member slides relative to the second section, the rotary plate rotates relative to the second section and causes the first section to move and rotate relative to the second section in a tilted orientation.

9. The electronic device as claimed in claim 8, further comprising a connecting member, wherein the connecting member includes a first sliding portion and a second sliding portion integrally formed together, the first sliding portion is slidably engaged with the second section, the second sliding portion is slidably engaged with the sliding member.

10. The electronic device as claimed in claim 9, wherein a rail is formed on each side of the second section, the first sliding portion is slidably engaged with the rails.

11. The electronic device as claimed in claim 10, wherein a guiding edge is formed on each side of the sliding member, the second sliding portion is slidably engaged with the guiding edges.

12. The electronic device as claimed in claim 11, wherein a protruding tab extends from one side of each second sliding portion, an elastic element is adjacent to a corresponding guiding edge for stopping the reverse slide of the sliding module.

13. The electronic device as claimed in claim 8, wherein the rotary plate includes a first hinged portion at one side thereof, the first section includes a pivot seat, and the first hinged portion is connected to the pivot seat.

14. The electronic device as claimed in claim 13, wherein the rotary plate includes a second hinged portion formed at an opposite side of the first hinged portion, the second section includes a pair of hinge tabs, and the second hinged portion is connected to the pair of hinge tabs.

* * * * *